(12) United States Patent
Summers

(10) Patent No.: US 9,970,212 B2
(45) Date of Patent: May 15, 2018

(54) SHADE AND CLAMP DEVICE

(71) Applicant: Nicholas Summers, Dawsonville, GA (US)

(72) Inventor: Nicholas Summers, Dawsonville, GA (US)

( * ) Notice: Subject to any disclaimer, the term of this patent is extended or adjusted under 35 U.S.C. 154(b) by 0 days. days.

(21) Appl. No.: 15/152,577

(22) Filed: May 12, 2016

(65) Prior Publication Data
US 2017/0328083 A1   Nov. 16, 2017

(51) Int. Cl.
*E04H 15/34* (2006.01)
*F16B 2/10* (2006.01)
*F16M 13/02* (2006.01)
*A45B 11/00* (2006.01)

(52) U.S. Cl.
CPC ............ *E04H 15/34* (2013.01); *F16B 2/10* (2013.01); *F16M 13/022* (2013.01); *A45B 11/00* (2013.01)

(58) Field of Classification Search
CPC .......... A45B 11/00; E04H 15/34; F16B 2/10; F16M 13/022
USPC ... 248/229.1, 292.12, 220.21, 205.1, 229.12, 248/229.13, 414; 316/5
See application file for complete search history.

(56) References Cited

U.S. PATENT DOCUMENTS

| | | | | |
|---|---|---|---|---|
| 2,144,140 A * | 1/1939 | Batcheller | ............... | F16B 2/065 24/514 |
| 2,828,758 A * | 4/1958 | Moro | ..................... | A45B 23/00 135/155 |
| 4,865,380 A * | 9/1989 | Heitzman-Powell | .... | B60N 2/44 135/96 |
| 5,033,528 A * | 7/1991 | Volcani | ................... | A45B 17/00 160/351 |
| 5,301,999 A * | 4/1994 | Thompson | ............... | B60N 2/26 248/284.1 |
| 5,397,268 A * | 3/1995 | Chang | ...................... | A45B 3/00 297/184.1 |
| 5,765,793 A * | 6/1998 | Yu | .......................... | F21S 6/003 248/126 |
| 6,073,897 A * | 6/2000 | Warren | ................ | F16M 11/105 248/278.1 |
| 6,173,725 B1 * | 1/2001 | Garth | ....................... | A47C 7/66 135/117 |
| 6,293,292 B1 * | 9/2001 | Watzke | .................... | A47C 7/66 135/123 |
| 6,405,742 B1 * | 6/2002 | Driscoll | ................. | A45B 11/00 135/20.1 |
| 8,602,662 B1 * | 12/2013 | Mans | ................... | F16M 11/041 248/160 |
| 2006/0054772 A1 * | 3/2006 | Priscott | .................. | A45B 11/00 248/558 |

(Continued)

FOREIGN PATENT DOCUMENTS

GB            2340083 A  *  2/2000  ............ A45B 11/00

*Primary Examiner* — Noah Chandler Hawk
(74) *Attorney, Agent, or Firm* — Ed H. Khalili; Bekiares Eliezer LLP

(57) ABSTRACT

Disclosed herein are device and system for providing shade including: a) a deformable screen assembly having a border about its edge, the screen assembly including: i) a support frame defining the edge of the screen assembly, and ii) a screen component having at least two apertures for receiving an adjustable arm, the apertures being contained within the screen assembly edge; and; b) an adjustable arm. Also disclosed herein are devices for clamping an object.

14 Claims, 10 Drawing Sheets

(56) References Cited

U.S. PATENT DOCUMENTS

| | | | |
|---|---|---|---|
| 2009/0139669 A1* | 6/2009 | Robin | A45B 11/00 160/351 |
| 2011/0048482 A1* | 3/2011 | Yerian | E06B 9/24 135/125 |
| 2017/0009482 A1* | 1/2017 | Remolina | E04H 15/34 |

* cited by examiner

SHADE AND CLAMP DEVICE

FIELD OF INVENTION

The present invention relates to devices and systems for shading, and improved clamping devices for securing the shading devices.

BACKGROUND OF THE INVENTION

It is often necessary or desirable to shade oneself from excessive and potentially harmful sun exposure. Umbrellas are a common type of device that is used to provide protection from the sun in a number of various settings. For example, larger umbrellas offer protection from exposure to the sun while on a beach. Larger beach umbrellas typically have an elongated post with a tapered end for insertion of the post into a support such as the sand and/or a weighted base to support the post vertically and during windy conditions. However, beach umbrellas are bulky, and difficult to move and position with the changing sun.

While smaller, personal umbrellas may be more convenient and portable, they have to be held by the user and cannot be secured in place. Moreover, umbrellas are not easily stored nor easily carried to certain places, such as sporting events.

Accordingly, there remains a need for new shading devices and systems which are relatively light weight, capable of being folded to a relatively compact size, and can be secured to a number of support structures. Additionally, the shading devices and systems should employ improved securement devices that are versatile enough to clamp and/or clip to support structures of varying sizes. This need and other needs are satisfied by the various aspects of the present disclosure.

SUMMARY OF THE INVENTION

In accordance with the purposes of the invention, as embodied and broadly described herein, the invention, in one aspect, relates to a device and system for providing shade comprising: a) a deformable screen assembly having a border about its edge, the screen assembly comprising: i) a support frame defining the edge of the screen assembly, and ii) a screen component having at least two apertures for receiving an adjustable arm, the apertures being contained within the screen assembly edge; and; b) an adjustable arm having first and second opposed ends, the first end of the adjustable arm being detachably connected to the screen assembly by extending through a first aperture from a first side of the screen assembly to a second side of the screen assembly, and by extending through a second aperture from the second side of the screen assembly to the first side of the screen assembly. In a further aspect, the further comprises a securement device for securing the adjustable arm to an object, wherein the second end of the arm is connected to the securement device.

In another exemplary aspect, the invention relates to a system for providing shade, comprising: a) a deformable screen assembly having a border about its edge, the screen assembly comprising: i) a support frame defining the edge of the screen assembly, and ii) a screen component having at least two apertures for receiving an adjustable arm, the apertures being contained within the screen assembly edge; b) an adjustable arm having first and second opposed ends, the first end of the adjustable arm being detachably connected to the screen assembly by extending through a first aperture from a first side of the screen assembly to a second side of the screen assembly, and by extending through a second aperture from the second side of the screen assembly to the first side of the screen assembly; and c) a securement device comprising: i) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and ii) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and an outer surface of the first or second clip arm.

In another exemplary aspect, the invention relates to a device for clamping an object, comprising: a) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and b) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and a outer surface of the first or second clip arm.

In further aspects, the invention also relates to methods for using the disclosed devices and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1:
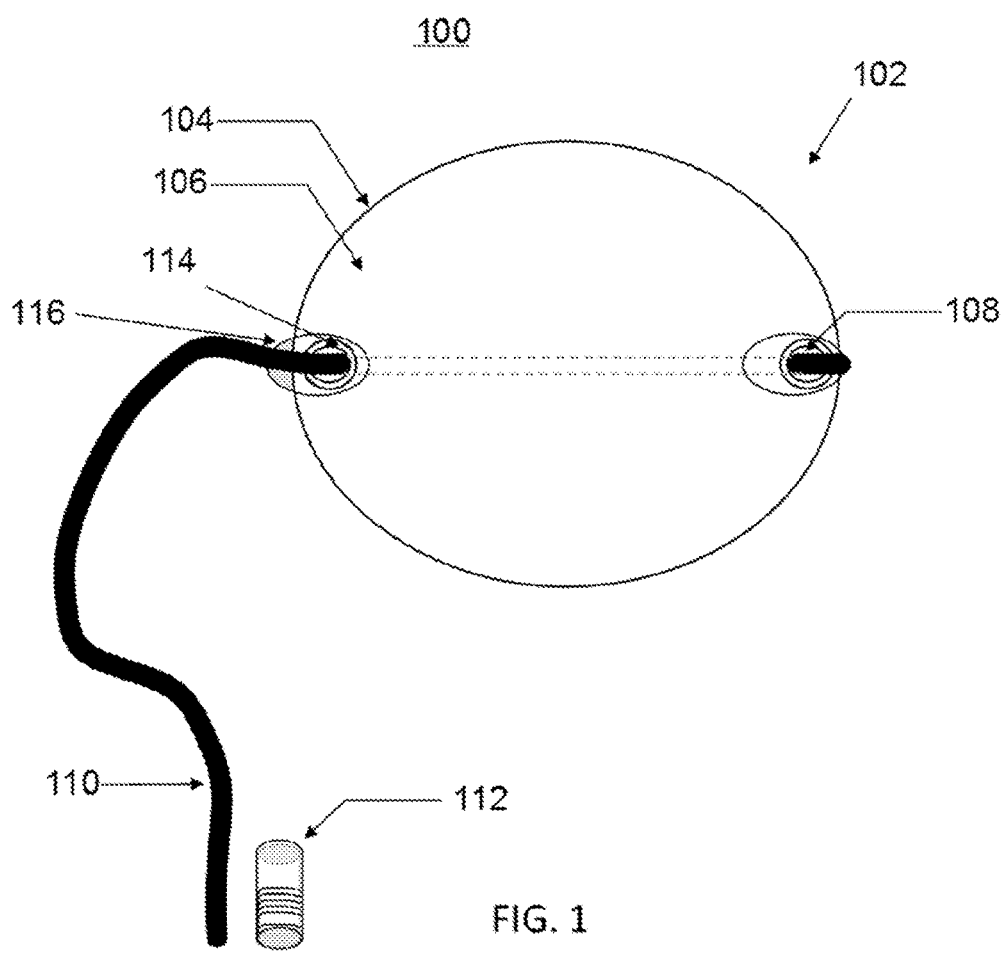
FIG. 1 shows a depiction of a shading system comprising a screen assembly detachably connected to an adjustable arm in accordance with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an aperture" includes two or more apertures.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Shading Device and System

As briefly described above, the present disclosure relates, in various aspects, to a devices and systems for providing shade, such as from the sun, or the like. In one aspect, the present disclosure provides a shading system comprising: a) a deformable screen assembly having a border about its edge, the screen assembly comprising: i) a support frame defining the edge of the screen assembly, and ii) a screen component having at least two apertures for receiving an adjustable arm, the apertures being contained within the screen assembly edge; and; b) an adjustable arm having first and second opposed ends, the first end of the adjustable arm being detachably connected to the screen assembly by extending through a first aperture from a first side of the screen assembly to a second side of the screen assembly, and by extending through a second aperture from the second side of the screen assembly to the first side of the screen assembly. In a further aspect, the further comprises a securement device for securing the adjustable arm to an object, wherein the second end of the arm is connected to the securement device.

In a further aspect, the components can be releasably connected. In a still further aspect, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like.

In a still further aspect, the second end of the adjustable arm is integrally or mechanically attached to the securement device. In a yet further aspect, the second end of the adjustable arm is detachably connected to the securement device. In some aspects, the second end of the adjustable arm is connected to the securement device by a connecting means, the connecting means comprising a fitting, insert, adhesive, brazing, soldering, welding, spot weld, screw with nut, or rivet, or a combination thereof. In other aspects, the adjustable arm is connected to the securement device by a fitting, insert, threading, friction fit, snap-fit or other suitable type of attachment or interlocking mechanism, or by other features that makes the state of two mechanisms or functions mutually dependent.

In a further aspect, the securement device comprises a port for receiving the second end of the adjustable arm. In a still further aspect, the port comprises a cylindrical wall and a bottom base wall. In a yet further aspect, the walls define an open cavity for receiving the second end of the adjustable arm. In an even further aspect, the securement device is comprised of metal, thermoplastic resin, ceramic, wood, or a combination thereof.

In further aspect, a fitting is mounted to the second end of the adjustable arm. In a still further aspect, the second end of the adjustable arm is connected to the securement device by inserting the fitting into the securement device port. In a yet further aspect, the fitting and the port are connected by threading, friction fit, snap-fit, or other suitable type of attachment or interlocked by other features that makes the state of two mechanisms or functions mutually dependent. In an even further aspect, the first portion of the fitting is externally threaded or affixable via friction fit, snap-fit or other suitable type of attachment interlockable by other features and the port is internally threaded or affixable via friction fit, snap-fit or other suitable type of attachment interlockable by other features such that the state of two mechanisms or functions are mutually dependent.

In a further aspect, an insert is mounted to the second end of the adjustable arm. In a still further aspect, the second end of the adjustable arm is connected to the securement device by inserting the insert into the port of the securement device. In a yet further aspect, a threaded insert is mounted to the second end of the adjustable arm. In an even further aspect, the securement device port comprises a threaded portion, and the threaded insert is threadably connected to the threaded portion of the securement device port.

In a further aspect, at least a first portion of the second end of the adjustable arm and at least a portion of the port are threaded. In a still further aspect, the first portion of the second end of the adjustable arm is externally threaded and the port is internally threaded. In a yet further aspect, at least a first portion of the fitting and at least a portion of the port are threaded. In an even further aspect, the first portion of the fitting is externally threaded and the port is internally threaded.

In a further aspect, the wall of the port is internally threaded and the first portion of the second end of the adjustable arm is externally threaded, and the wall of the port and the arm are configured to engage so that the arm can be secured to the securement device. In a still further aspect, the wall of the port is externally threaded and the first portion of the second end of the adjustable arm is internally threaded, and the wall of the port and the arm are configured to engage so that the arm can be secured to the securement device. In a yet further aspect, the wall of the port is internally threaded and the first portion of the fitting is externally threaded, and wherein the wall of the port and the fitting are configured to engage so that the adjustable arm can be secured to the securement device.

In a further aspect, a first portion of the insert is externally threaded and the port is internally threaded. In a still further aspect, the wall of the port is externally threaded and the first portion of the insert is internally threaded, and the wall of the port and the fitting are configured to engage so that the adjustable arm can be secured to the securement device. In some aspects, the adjustable arm and securement device are attached by screwing the adjustable arm and securement device together.

In a further aspect, the securement device is a spike, clip, clamp, or bracket, or a combination thereof. In a still further aspect, the securement device is a spike comprising a port for receiving the arm at first end, and wherein the spike is configured to anchor the adjustable arm in the ground. In some aspects, the spike further comprises at least one handle at a second of the spike, and wherein the handle is configured to further anchor the spike. In other aspects, the spike further comprises a first handle and a second handle at the second end of the spike, and wherein the handle is configured to further anchor the spike. In yet further aspects, the securement device is a clip comprising a port for receiving the arm, and wherein the clip is configured to clamp the shading device to the object.

In a further aspect, the securement device is a clamping device. In a still further aspect, the clamping device comprises: a) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and b) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and a outer surface of the first or second clip arm.

In a further aspect, the first end of the clamping arm is detachably connected to the first and second clip arms by extending through the aperture of the first clip arm from a first side of the first clip arm to a second side of the first clip arm, and by extending through the aperture of the second clip arm from a first side of the second clip arm to a second side of the second clip arm. In a yet further aspect, the first or second clip arm aperture is on a surface of the first handle portion or second handle portion. In a still further aspect, the clip arm apertures are on a surface of the first handle portion and second handle portion.

In a further aspect, the first jaw or second jaw comprise a gripping pad portion. In a still further aspect, the first jaw and second jaw comprise a gripping pad portion. In a yet further aspect, the first jaw or second jaw comprise a gripping pad portion. In an even further aspect, the gripping pad portion is substantially flat. In a still further aspect, the gripping pad portion is pivotally connected. In a yet further aspect, the gripping pad portion comprises a compressible material.

In a further aspect, the flat plate portion comprises a compressible material. In a still further aspect, at least a portion the first jaw or second jaw comprise a plurality of teeth, or a combination thereof. In a yet further aspect, the outer surface of the first jaw or second jaw comprise a grip pad. In an even further aspect, the grip pad comprises a compressible material.

In various aspects of the shading system, the clamping arm is connected to the clip arm by a fitting, insert, threading, friction fit, snap-fit or other suitable type of attachment or interlocking mechanism, or by other features that makes the state of two mechanisms or functions mutually dependent. In a further aspect, the clip arm aperture comprises a cylindrical inner wall, and wherein the inner wall defines an opening for receiving the clamping arm. In a still further aspect, a fitting is mounted to the inner wall of the aperture, and wherein the clamping arm is connected to the clip arm by inserting the clamping arm into the clip arm aperture. In a yet further aspect, the fitting and the clamping arm are connected by threading, friction fit, snap-fit, or other suitable type of attachment or interlocked by other features that makes the state of two mechanisms or functions mutually dependent. In some aspects, a first portion of the fitting is threaded or affixable via friction fit, snap-fit or other suitable type of attachment interlockable by other features, and a portion of the clamping arm is threaded or affixable via friction fit, snap-fit or other suitable type of attachment interlockable by other features such that the state of two mechanisms or functions are mutually dependent.

In a further aspect, an insert is mounted to the inner wall of the aperture, and wherein the clamping arm is connected to the clip arm by inserting the clamping arm into the clip arm aperture. In a still further aspect, an insert is mounted to the inner wall of the aperture, wherein the clamping arm comprises a threaded portion, and wherein the insert is threadably connected to the threaded portion of the clamping arm. In some aspects, the clamping arm comprises a ratcheting teeth portion, and wherein the insert is ratchetably connected to the teeth portion of the clamping arm.

In various aspects, at least a portion of the clamping arm and at least a portion of the inner wall of the clip arm aperture are threaded. In a further aspect, a portion of the clamping arm is externally threaded and the clip arm aperture is internally threaded. In a still further aspect, at least a portion of the fitting and at least a portion of the clamping arm are threaded. In an even further aspect, the threaded portion of the fitting is internally threaded and the clamping arm is externally threaded. In some aspects, the wall of the clip arm aperture is internally threaded and the threaded portion of the clamping arm is externally threaded, and wherein the wall of the clip arm aperture and the clamping arm are configured to engage so that the clamping arm can be secured to the clip arm. In other aspects, the wall of the clip arm aperture is externally threaded and the threaded portion of the clamping arm is internally threaded, and wherein the wall of the clip arm aperture and the clamping arm are configured to engage so that the clamping arm can be secured to the clip arm. In a further aspect, the clamping arm and the clip arm are attached by screwing the clamping arm and the clip arm together.

In a further aspect, the screen assembly further comprises a grommet defining the edge of the aperture. In a still further aspect, the screen assembly further comprising a grommet washer defining the outer edge of the grommet. In a further aspect, the shade component can be comprised of any desired UV reducing and/or sun shading material, such as, and without limitation, fabric, cloth, plastic, woven or non-woven, natural or synthetic, or the like.

In various aspects, the adjustable arm comprises a bendable interior member and a protective outer member enclosing the interior member. In a further aspect, the bendable interior member comprises a metal rod. In a still further aspect, the interior member can be selected from a wide variety of relatively stiff, but pliable materials, such as thin steel rods, aluminum rods, copper rods, and the like. In a yet further aspect, the protective outer member comprises a comprises a compressible material.

Without wishing to be bound by a particular theory, the combination of inventive arm connecting configurations, apertures locations, and/or securement devices allow the shading system to be used in unfavorable conditions, such in windy conditions. In some aspects, the shade device can support wind speed of at least about 10 mph, such as, for example, 11, 12, 13, 14, 15, 16, 17, 18, 19, 20, 21, 22, 23, 24, 25, 26, 27, 28, 29, or 30 mph. Moreover, the system can be attached to any desired object, and thus, can be used in any desired location. In a further aspect, the object can be any support structure, apparatus, or the ground, or the like. In a still further aspect, the support structure can be an article of furniture, such as, for example, beach or pool furniture.

In a further aspect, the components of the shading system can be deformed and packed for portability. In a still further aspect, the screen assembly and/or adjustable arm can be reconfigured to be in a collapsed state. In a yet further aspect, the system can further comprise a bag for receiving the screen assembly, adjustable arm, and securement device; the screen assembly and adjustable arm being in a collapsed state.

In at least one aspect, disclosed herein is a system for providing shade, comprising: a) a deformable screen assembly having a border about its edge, the screen assembly comprising: i) a support frame defining the edge of the screen assembly, and ii) a screen component having at least two apertures for receiving an adjustable arm, the apertures being contained within the screen assembly edge; b) an adjustable arm having first and second opposed ends, the first end of the adjustable arm being detachably connected to the screen assembly by extending through a first aperture from a first side of the screen assembly to a second side of the screen assembly, and by extending through a second aperture from the second side of the screen assembly to the first side of the screen assembly; and c) a securement device comprising: i) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and ii) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and an outer surface of the first or second clip arm.

C. Clip and Clamp Device

In various further aspects, the present disclosure also relates, to devices for clipping or clamping an object. In one aspect, the present disclosure provides a device for clamping an object, comprising: a) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and b) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and a outer surface of the first or second clip arm.

According to further aspects of the clamping device, the first end of the clamping arm is detachably connected to the first and second clip arms by extending through the aperture of the first clip arm from a first side of the first clip arm to a second side of the first clip arm, and by extending through the aperture of the second clip arm from a first side of the second clip arm to a second side of the second clip arm. In a yet further aspect, the first or second clip arm aperture is on a surface of the first handle portion or second handle portion. In a still further aspect, the clip arm apertures are on a surface of the first handle portion and second handle portion.

In a further aspect, the first jaw or second jaw comprise a gripping pad portion. In a still further aspect, the first jaw and second jaw comprise a gripping pad portion. In a yet further aspect, the first jaw or second jaw comprise a gripping pad portion. In an even further aspect, the gripping pad portion is substantially flat. In a still further aspect, the gripping pad portion is pivotally connected. In a yet further aspect, the gripping pad portion comprises a compressible material.

In a further aspect, the flat plate portion comprises a compressible material. In a still further aspect, at least a portion the first jaw or second jaw comprise a plurality of teeth, or a combination thereof. In a yet further aspect, the outer surface of the first jaw or second jaw comprise a grip pad. In an even further aspect, the grip pad comprises a compressible material.

According to various aspects of the clamping device, the clamping arm is connected to the clip arm by a fitting, insert, threading, friction fit, snap-fit or other suitable type of attachment or interlocking mechanism, or by other features that makes the state of two mechanisms or functions mutually dependent. In a further aspect, the clip arm aperture comprises a cylindrical inner wall, and wherein the inner wall defines an opening for receiving the clamping arm. In a still further aspect, a fitting is mounted to the inner wall of the aperture, and wherein the clamping arm is connected to the clip arm by inserting the clamping arm into the clip arm aperture. In a yet further aspect, the fitting and the clamping arm are connected by threading, friction fit, snap-fit, or other suitable type of attachment or interlocked by other features that makes the state of two mechanisms or functions mutually dependent. In some aspects, a first portion of the fitting is threaded or affixable via friction fit, snap-fit or other suitable type of attachment interlockable by other features, and a portion of the clamping arm is threaded or affixable via friction fit, snap-fit or other suitable type of attachment interlockable by other features such that the state of two mechanisms or functions are mutually dependent.

In a further aspect, an insert is mounted to the inner wall of the aperture, and wherein the clamping arm is connected to the clip arm by inserting the clamping arm into the clip arm aperture. In a still further aspect, a threaded insert is mounted to the inner wall of the aperture, wherein the clamping arm comprises a threaded portion, and wherein the threaded insert is threadably connected to the threaded portion of the clamping arm.

In various further aspects of the clamping device, at least a portion of the clamping arm and at least a portion of the inner wall of the clip arm aperture are threaded. In a further aspect, a portion of the clamping arm is externally threaded and the clip arm aperture is internally threaded. In a still further aspect, at least a portion of the fitting and at least a portion of the clamping arm are threaded. In an even further aspect, the threaded portion of the fitting is internally threaded and the clamping arm is externally threaded. In some aspects, the wall of the clip arm aperture is internally threaded and the threaded portion of the clamping arm is externally threaded, and wherein the wall of the clip arm aperture and the clamping arm are configured to engage so that the clamping arm can be secured to the clip arm. In other aspects, the wall of the clip arm aperture is externally threaded and the threaded portion of the clamping arm is internally threaded, and wherein the wall of the clip arm aperture and the clamping arm are configured to engage so that the clamping arm can be secured to the clip arm. In a further aspect, the clamping arm and the clip arm are attached by screwing the clamping arm and the clip arm together.

According to various aspects of the invention, the shading devices and systems can comprise multiple configurations. For example, various exemplary embodiments of the inventive shading devices and systems are shown in FIGS. 1-1.

In further aspects, FIG. 1 shows a shading system 100 comprising: a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge; and; b) an adjustable arm 110 having first and second opposed ends. This exemplary system also comprises a grommet 114 defining the edge of the aperture, a grommet washer 116 defining the outer edge of the grommet, and an unattached threaded fitting 112, which can be mounted or attached to the second end of the adjustable arm, and can facilitate connection or coupling of the adjustable arm with the securement device, for example, by inserting or screwing the fitting into a securement device port. As further depicted by the dashed lines in FIG. 1, the first end of the adjustable arm is detachably connected to the screen assembly by extending through a first aperture from a first side of the screen assembly to a second side of the screen assembly, and by extending through a second aperture from the second side of the screen assembly to the first side of the screen assembly.

Figure 2:
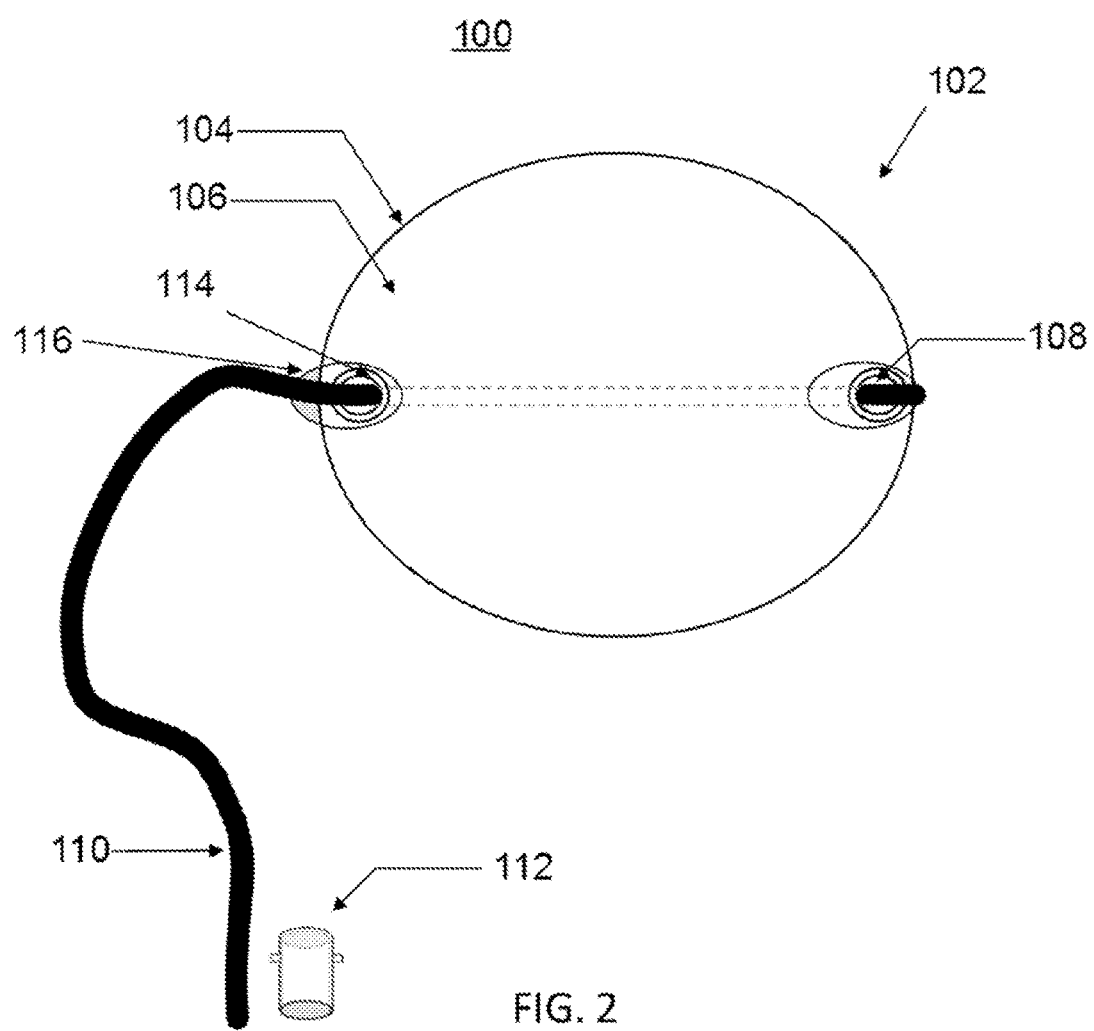
FIG. 2 shows a depiction of a shading system comprising a screen assembly detachably connected to an adjustable arm in accordance with an exemplary embodiment of the present invention.

In further aspects, FIG. 2 shows a shading system 100 comprising: a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge; and; b) an adjustable arm 110 having first and second opposed ends. This exemplary system also comprises a grommet 114 defining the edge of the aperture, a grommet washer 116 defining the outer edge of the grommet, and an unattached twist and lock fitting 112, which can be mounted or attached to the second end of the adjustable arm, and can facilitate connection or coupling of the adjustable arm with the securement device, for example, by inserting and screwing or twisting the fitting into a securement device port. As further depicted by the dashed lines in FIG. 2, the first end of the adjustable arm is detachably connected to the screen assembly by extending through a first aperture from a first side of the screen assembly to a second side of the screen assembly, and by extending through a second aperture from the second side of the screen assembly to the first side of the screen assembly.

Figure 3:
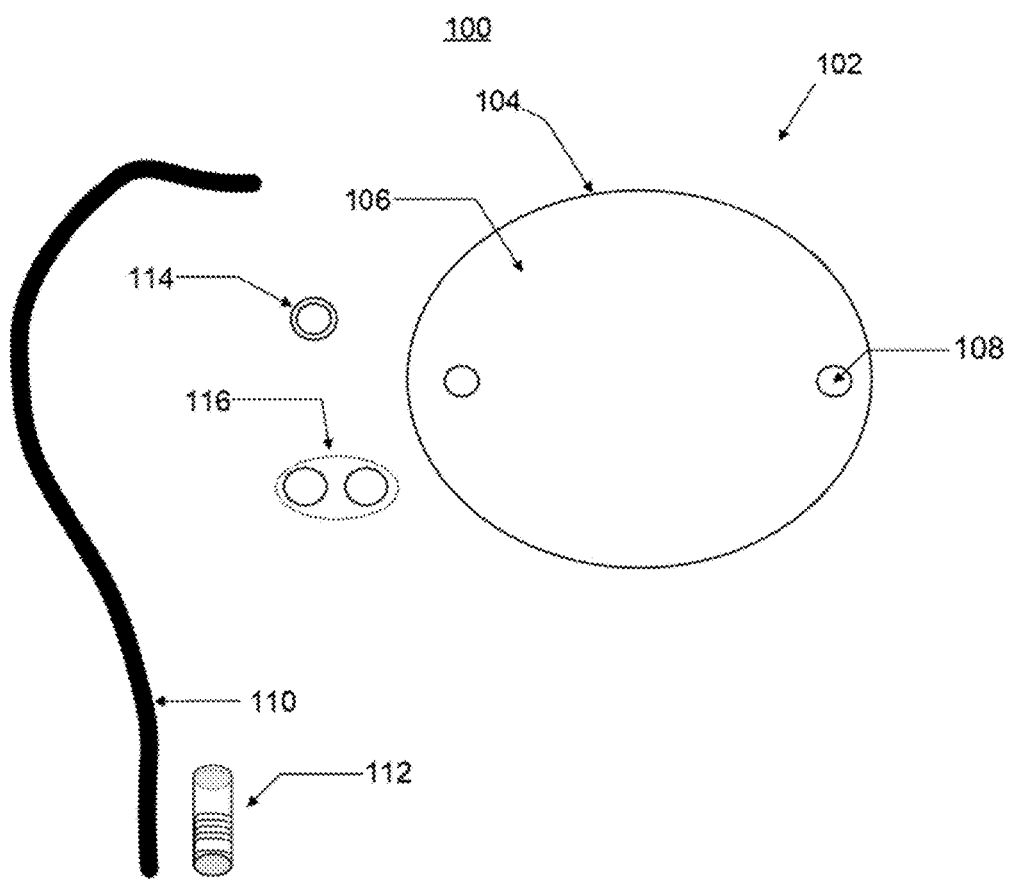
FIG. 3 shows an exploded depiction of a shading system comprising a screen assembly and adjustable arm in accordance with an exemplary embodiment of the present invention.

FIG. 3 shows an exploded view of the components of the shading system depicted in FIG. 1. The exemplary shading system comprises a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge; and; b) an adjustable arm 110 having first and second opposed ends, and a fitting for the second end of the adjustable arm for connecting to a securement device, a grommet defining the edge of the aperture, and a grommet washer defining the outer edge of the grommet.

Figure 4:
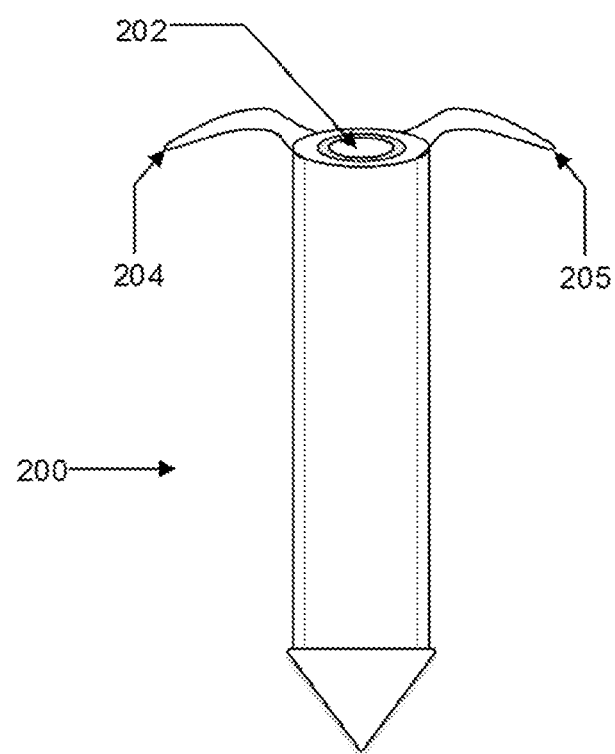
FIG. 4 shows a depiction of a securement device comprising a spike in accordance with an exemplary embodiment of the present invention.

FIG. 4 shows an exemplary securement device 200 in the form of a spike. In this exemplary embodiment, the spike comprises a port 202 for receiving an adjustable arm at a first end, and a first handle 204 and a second handle 208 at the second end of the spike. As depicted in FIG. 4, the handle can be configured or curved such that portion of the handle will penetrate the ground to further anchor the spike.

Figure 5:
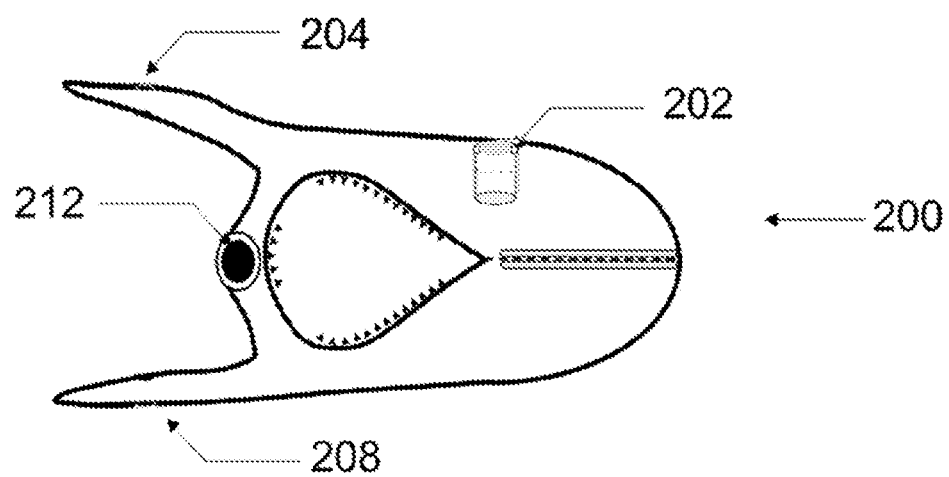
FIG. 5 shows a depiction of a securement device comprising a clip in accordance with an exemplary embodiment of the present invention.

FIG. 5 shows an exemplary securement device 200 in the form of a clip. In this exemplary embodiment, the clip comprises a port 202 for receiving an adjustable arm, a first handle 204 and a second handle 208 pivotally connected by a clip spring 212. As depicted in FIG. 5, the clip is configured to clamp to an object when the first and second handles are forcibly separated into an open position in response to pressure on the first handle 204 and second handle 208.

Figure 6:
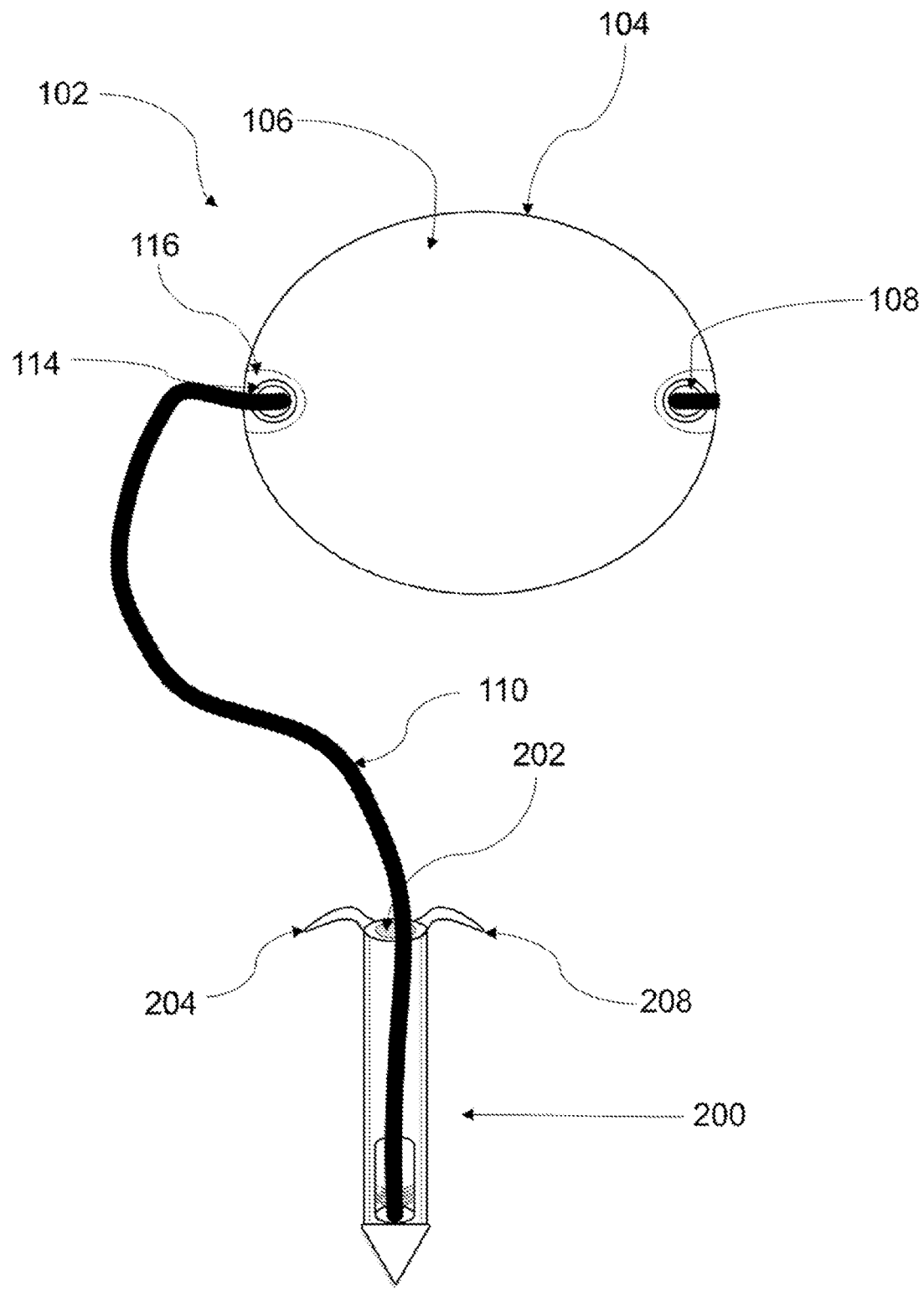
FIG. 6 shows a depiction of a shading system comprising a screen assembly detachably connected to an adjustable arm and a spike in accordance with an exemplary embodiment of the present invention.

FIG. 6 shows another exemplary embodiment of a shading system with components from FIGS. 1 and 3. In this exemplary embodiment, the shading system 100 comprises: a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge, and having a grommet 114 defining the edge of the aperture, and having a grommet washer 116 defining the outer edge of the grommet; b) an adjustable arm 110 having first and second opposed ends, with a threaded fitting mounted to the second end of the adjustable arm for connecting to a securement device; and c) a securement device 200 in the form of a spike, the spike having a port 202 at a first end for receiving the adjustable arm, and a first handle 204 and a second handle 208 at the second end of the spike. As further depicted in FIG. 6, the first end of the adjustable arm is detachably connected to the screen assembly by extending through a first aperture from a first side of the screen assembly to a second side of the screen assembly, and by extending through a second aperture from the second side of the screen assembly to the first side of the screen assembly, and the adjustable arm is connected to the securement device by inserting the mounted fitting into the securement device port.

Figure 7:
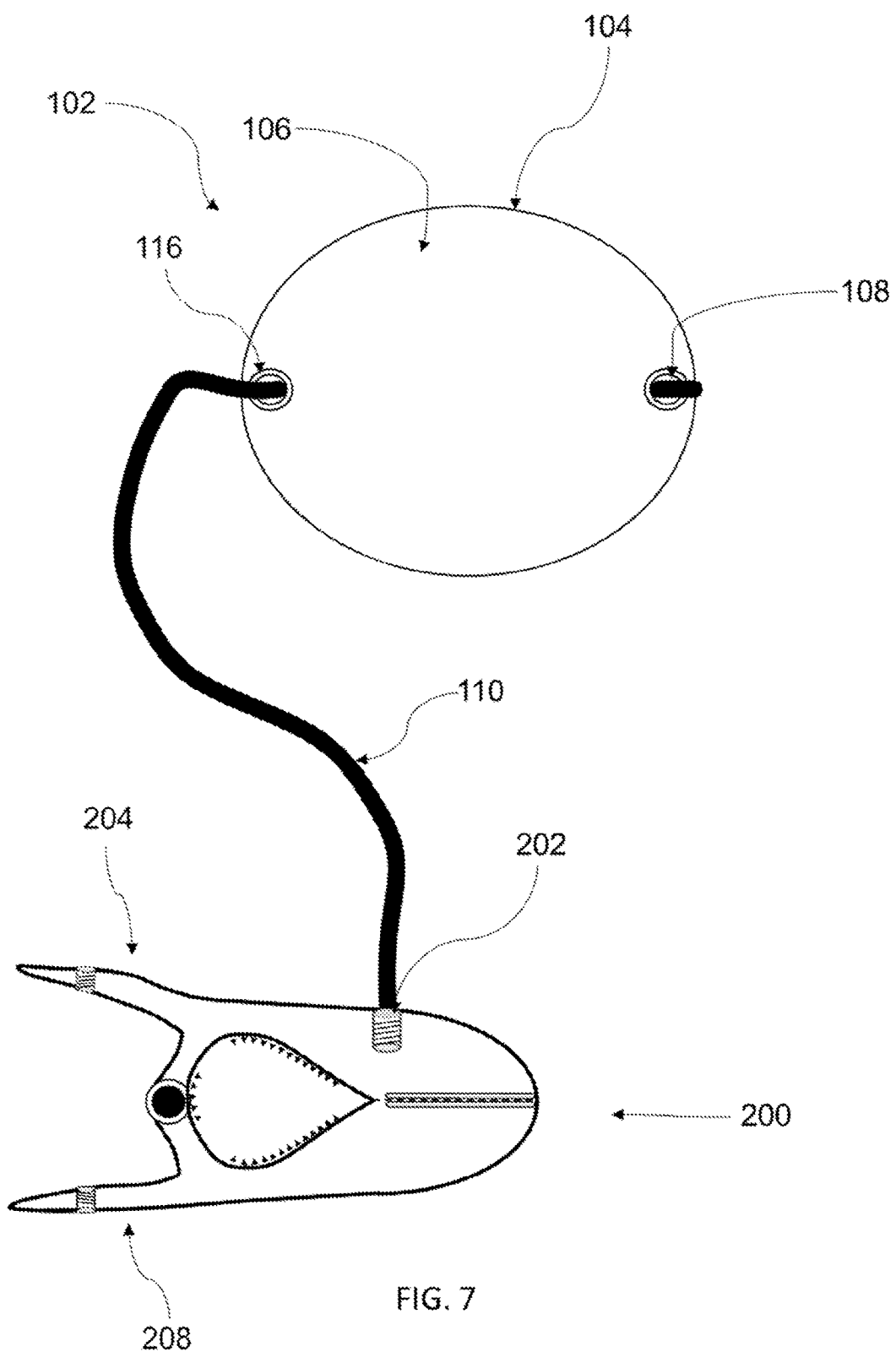
FIG. 7 shows a depiction of a shading system comprising a screen assembly detachably connected to an adjustable arm and a clip in accordance with an exemplary embodiment of the present invention.

FIG. 7 shows another exemplary embodiment of a shading system with components from FIGS. 1 and 4. In this exemplary embodiment, the shading system 100 comprises: a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge, and having a grommet 114 defining the edge of the aperture, and having a grommet washer 116 defining the outer edge of the grommet; b) an adjustable arm 110 having first and second opposed ends, with a threaded fitting mounted to the second end of the adjustable arm for connecting to a securement device; and c) a securement device 200 in the form of a clip. In this exemplary embodiment, the clip comprises a threaded port 202 for receiving the adjustable arm, and a first handle 204 and a second handle 208 pivotally connected by a clip spring 212. As further depicted in FIG. 7, the first end of the adjustable arm is detachably connected to the screen assembly by extending through a first aperture from a first side of the screen assembly to a second side of the screen assembly, and by extending through a second aperture from the second side of the screen assembly to the first side of the screen assembly, and the adjustable arm is connected to the securement device by screwing the mounted fitting into the threaded port of the clip.

Figure 8:
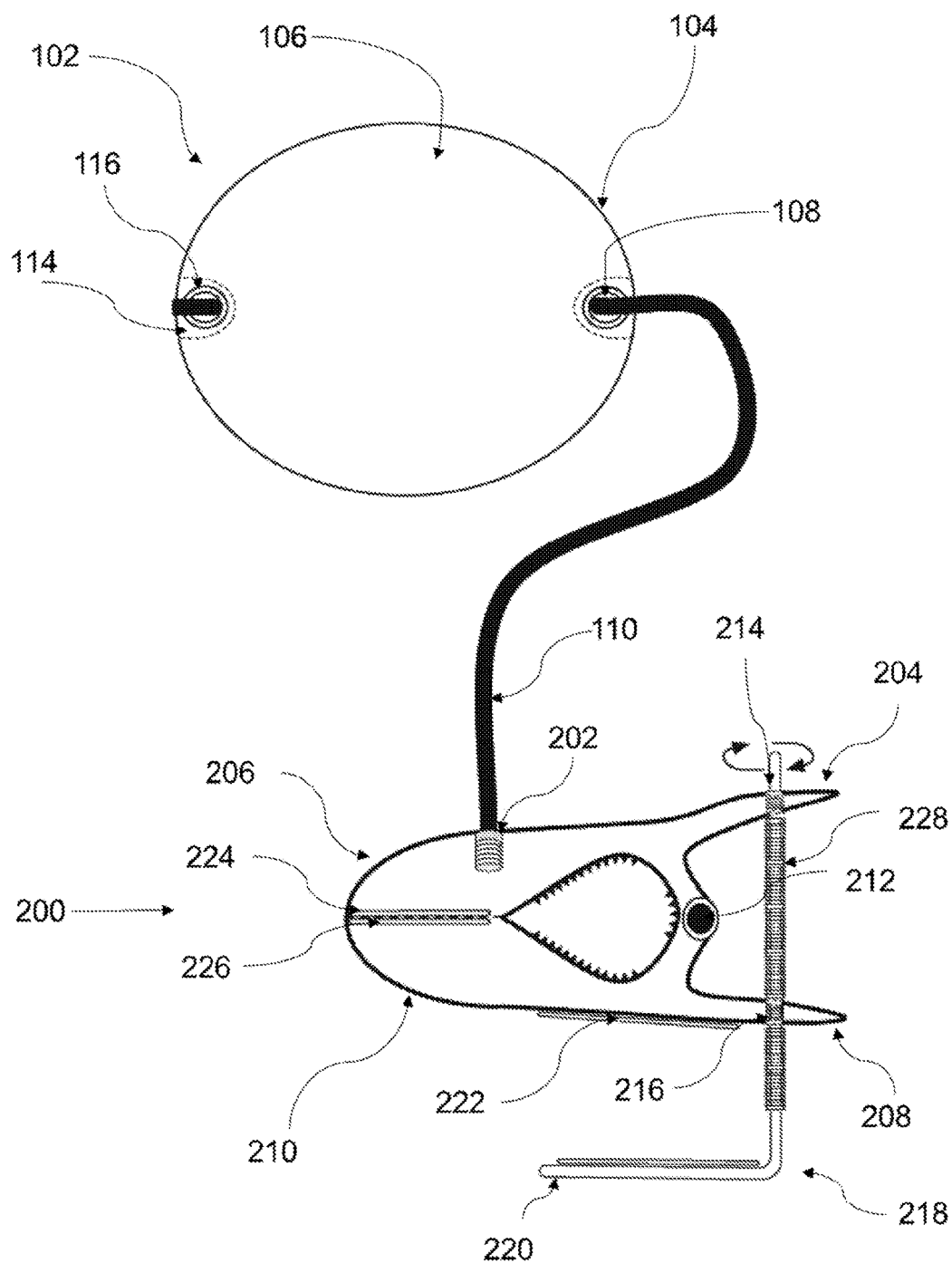
FIG. 8 shows a depiction of a shading system comprising a screen assembly detachably connected to an adjustable arm and a clamping device in accordance with an exemplary embodiment of the present invention.

FIG. 8 shows another exemplary embodiment of a shading system with components from FIG. 1 and an inventive clamping device of the present invention. In this exemplary embodiment, the shading system 100 comprises: a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge, and having a grommet 114 defining the edge of the aperture, and having a grommet washer 116 defining the outer edge of the grommet; b) an adjustable arm 110 having first and second opposed ends, with a threaded fitting mounted to the second end of the adjustable arm for connecting to a securement device; and c) a securement device 200 in the form of the disclosed clamping device. In this exemplary embodiment, the clamping device comprises: a) spring clip 200 comprising: two clip arms pivotally connected at a pivot point by a spring joint 212, the first clip arm having a first handle portion 204, a first jaw 206, a first threaded aperture 214, a first gripping pad portion 224, the second clip arm having a second handle portion 208, a second jaw 210, a second threaded aperture 216, and a second gripping pad portion, a threaded port 202 for receiving the adjustable arm, and a grip pad 222 on an outer surface of the spring clip; and b) a clamping arm 218 having a first end and an opposed second end, the clamping arm having a threaded portion 228 and a flat plate portion 220. In the embodiment depicted in FIG. 7, the spring joint is forcibly compressing the first and second jaws together in a closed position. However, when the clamping arm is not connected to the spring clip, the first and second jaws can be forcibly separated into an open position by applying pressure on the first and second handle portions, thus allowing a user to secure the clip to an object no more than 6 inches in width or diameter. For larger objects, the clamping arm can be optionally connected to the spring clip by extending the clamping arm through one or more clip arm apertures a first side of a clip arm to a second side of a clip arm, which will allow securing the clamping device to an object when the jaws are the closed position by forcibly compressing the object between the flat plate portion of the clamping arm and an outer surface of the spring clip. Contact points with the object can further comprise teeth or a compressible material to improve grip strength. As further depicted in FIG. 8, the clamping arm is threadably connected to both clip arm by extending through the threaded apertures of the spring clip, and the spring clip is able to be secured to a wider object relative to using the jaws.

Figure 9:
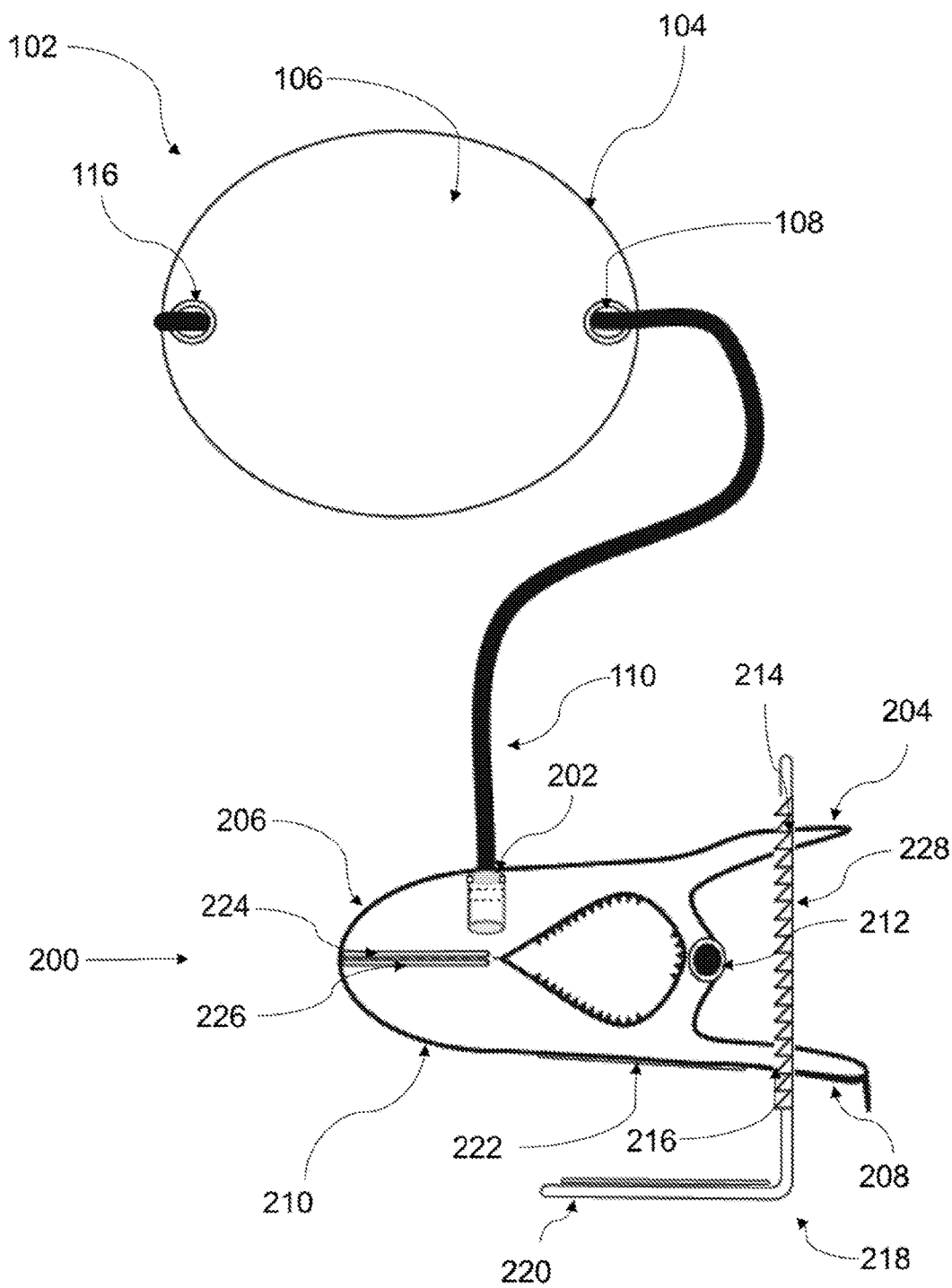
FIG. 9 shows a depiction of a shading system comprising a screen assembly detachably connected to an adjustable arm and a clamping device in accordance with an exemplary embodiment of the present invention.

FIG. 9 shows another exemplary embodiment of a shading system with components from FIG. 1 and an inventive clamping device of the present invention. In this exemplary embodiment, the shading system 100 comprises: a) a deformable screen assembly 102 having a border about its edge, the screen assembly comprising: i) a support frame 104 defining the edge of the screen assembly, and ii) a screen component 106 having at least two apertures 108 for receiving an adjustable arm, the apertures being contained within the screen assembly edge, and having a grommet 114 defining the edge of the aperture, and having a grommet washer 116 defining the outer edge of the grommet; b) an adjustable arm 110 having first and second opposed ends, with a threaded fitting mounted to the second end of the adjustable arm for connecting to a securement device; and c) a securement device 200 in the form of the disclosed clamping device. In this exemplary embodiment, the clamping device comprises: a) spring clip 200 comprising: two clip arms pivotally connected at a pivot point by a spring joint 212, the first clip arm having a first handle portion 204, a first jaw 206, a first aperture 214, a first gripping pad portion 224, the second clip arm having a second handle portion 208, a second jaw 210, a second aperture 216, and a second gripping pad portion, a twist and lock port 202 for receiving the adjustable arm, and a grip pad 222 on an outer surface of the spring clip; and b) a clamping arm 218 having a first end and an opposed second end, the clamping arm having a ratchet teethed portion 228 and a flat plate portion 220. In the embodiment depicted in FIG. 7, the spring joint is forcibly compressing the first and second jaws together in a closed position. However, when the clamping arm is not connected to the spring clip, the first and second jaws can be forcibly separated into an open position by applying pressure on the first and second handle portions, thus allowing a user to secure the clip to an object no more than 6 inches in width or diameter. For larger objects, the clamping arm can be optionally connected to the spring clip by extending the clamping arm through one or more clip arm apertures a first side of a clip arm to a second side of a clip arm, which will allow securing the clamping device to an object when the jaws are the closed position by forcibly compressing the object between the flat plate portion of the clamping arm and an outer surface of the spring clip. Contact points with the object can further comprise teeth or a compressible material to improve grip strength. As further depicted in FIG. 9, the clamping arm is connected to both clip arm by ratcheting through the apertures of the spring clip, and the spring clip is able to be secured to a wider object relative to using the jaws.

Figure 10:
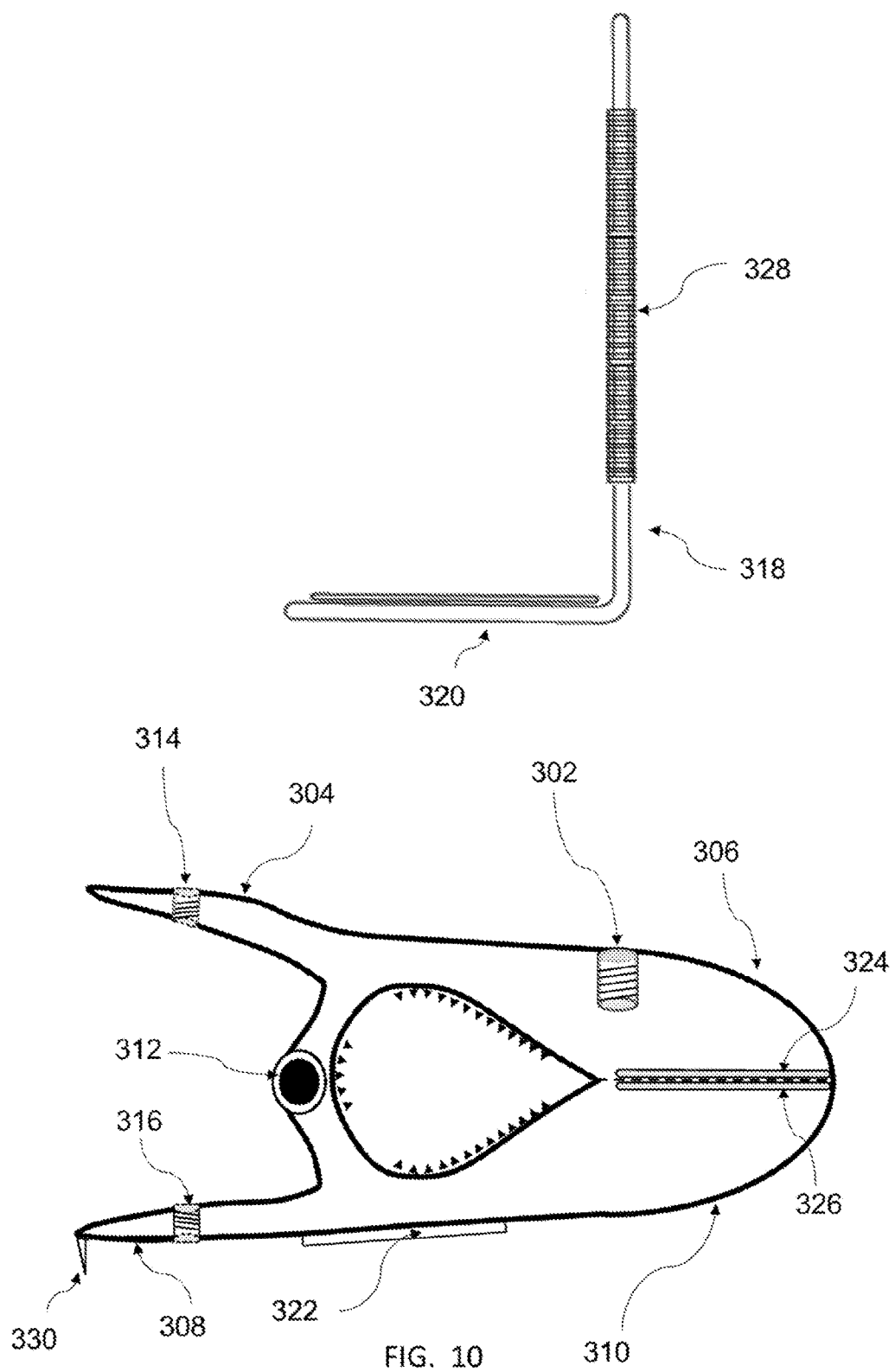
FIG. 10 shows a depiction of a clamping device comprising a spring clip and a clamping arm in accordance with an exemplary embodiment of the present invention.

FIG. 10 shows an exemplary embodiment of the presently disclosed device for clamping an object. In this exemplary embodiment, the clamping device 300 comprises: a) spring clip 301 comprising: two clip arms pivotally connected at a pivot point by a spring joint 312, the first clip arm having a first handle portion 304, a first jaw 306, a first threaded aperture 314, a first gripping pad portion 324, the second clip arm having a second handle portion 308, a second jaw 310, a second threaded aperture 316, and a second gripping pad portion, a threaded port 302 for receiving the adjustable arm, and a grip pad 322 on an outer surface of the spring clip; and b) a clamping arm 318 having a first end and an opposed second end, the clamping arm having a threaded portion 328 and a flat plate portion 320. In the embodiment depicted in FIG. 10, the spring joint is forcibly compressing the first and second jaws together in a closed position. However, the first and second jaws can be forcibly separated into an open position by applying pressure on the first and second handle portions, thus allowing a user to secure the clip to an object no more than 6 inches in width or diameter. As further depicted in FIG. 10, the clamping arm can be detachably connected, such as by inserting or screw, to the clip arms by extending through the apertures of the spring clip. When the clamp arm is utilized, the spring clip is able to be secured to wider and larger object relative to using the jaws. A connected clamping arm will allow securing the clamping device to an object when the jaws are the closed position by forcibly compressing the object between the flat plate portion of the clamping arm and an outer surface of the spring clip. In some aspects, the spring clip can further comprise a lip 330 extend from one or more handles. Additionally, any contact points with the object can further comprise teeth or a compressible material to improve grip strength.

Figure 11:
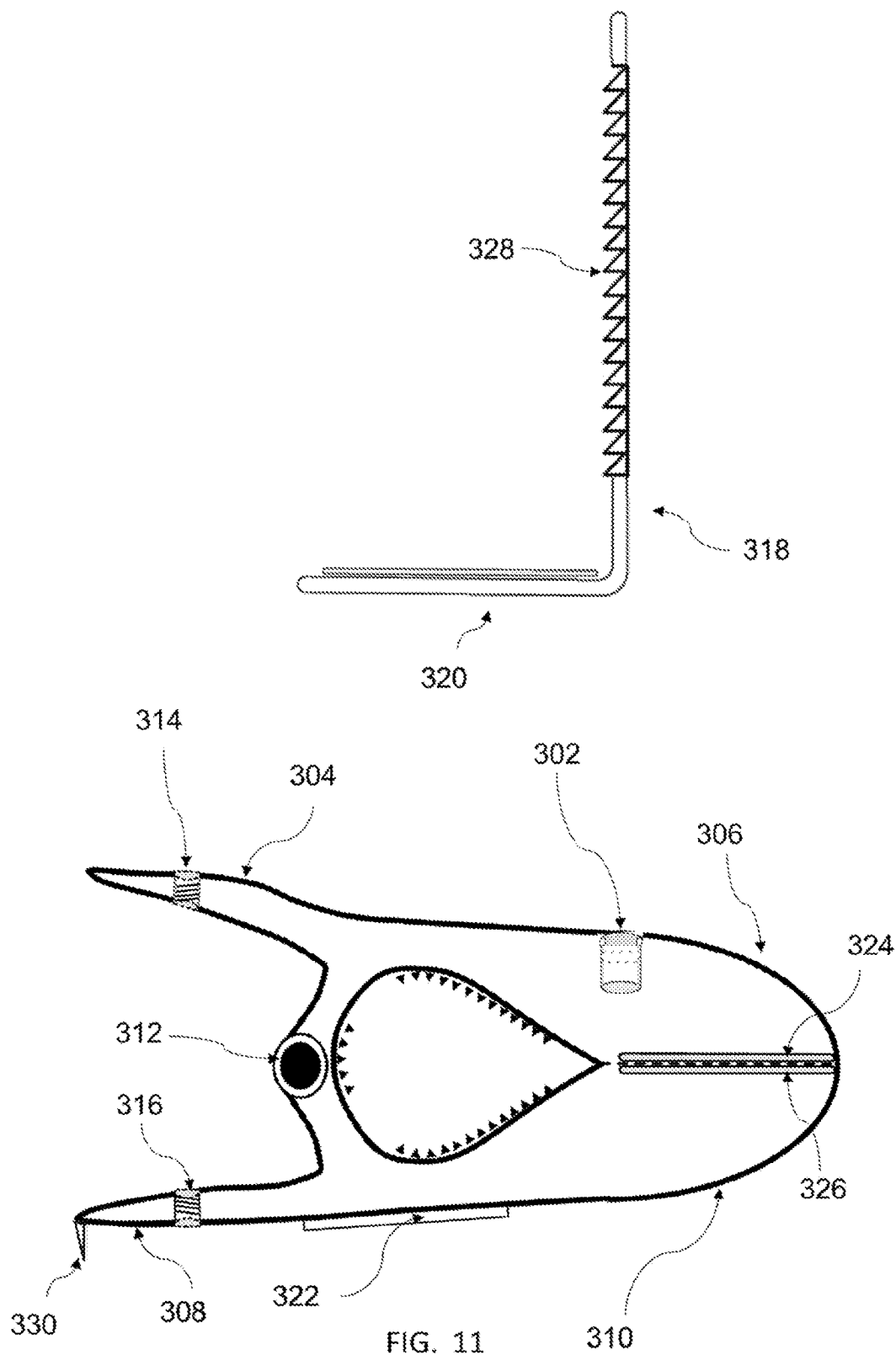
FIG. 11 shows a depiction of a clamping device comprising a spring clip and a clamping arm in accordance with an exemplary embodiment of the present invention.

FIG. 11 shows an exemplary embodiment of the presently disclosed device for clamping an object. In this exemplary embodiment, the clamping device 300 comprises: a) spring clip 301 comprising: two clip arms pivotally connected at a pivot point by a spring joint 312, the first clip arm having a first handle portion 304, a first jaw 306, a first aperture 314, a first gripping pad portion 324, the second clip arm having a second handle portion 308, a second jaw 310, a second aperture 316, and a second gripping pad portion, a twist and lock port 302 for receiving the adjustable arm, and a grip pad 322 on an outer surface of the spring clip; and b) a clamping arm 318 having a first end and an opposed second end, the clamping arm having a ratchet teethed portion 328 and a flat plate portion 320. In the embodiment depicted in FIG. 11, the spring joint is forcibly compressing the first and second jaws together in a closed position. However, the first and second jaws can be forcibly separated into an open position by applying pressure on the first and second handle portions, thus allowing a user to secure the clip to an object no more than 6 inches in width or diameter. As further depicted in FIG. 11, the clamping arm can be detachably connected, such as by inserting or ratcheting, to the clip arms by extending through the apertures of the spring clip. When the clamp arm is utilized, the spring clip is able to be secured to wider and larger object relative to using the jaws. A connected clamping arm will allow securing the clamping device to an object when the jaws are the closed position by forcibly compressing the object between the flat plate portion of the clamping arm and an outer surface of the spring clip. In some aspects, the spring clip can further comprise a lip 330 extending from one or more handles. Additionally, any contact points with the object can further comprise teeth or a compressible material to improve grip strength.

The disclosed devices and systems include at least the following aspects:

Aspect 1: A shading system comprising: a) a deformable screen assembly having a border about its edge, the screen assembly comprising: i) a support frame defining the edge of the screen assembly, and ii) a screen component having at least two apertures for receiving an adjustable arm, the apertures being contained within the screen assembly edge; and b) an adjustable arm having first and second opposed ends, the first end of the adjustable arm being detachably connected to the screen assembly by extending through a first aperture from a first side of the screen assembly to a second side of the screen assembly, and by extending through a second aperture from the second side of the screen assembly to the first side of the screen assembly.

Aspect 2: The system of aspect 1, further comprising a securement device for securing the adjustable arm to an object, wherein the second end of the arm is connected to the securement device.

Aspect 3: The system of aspect 2, wherein the second end of the adjustable arm is integrally or mechanically attached to the securement device.

Aspect 4: The system of aspect 2, wherein the second end of the adjustable arm is detachably connected to the securement device.

Aspect 5: The system of aspect 2, wherein the second end of the adjustable arm is connected to the securement device by a connecting means, the connecting means comprising a fitting, insert, adhesive, brazing, soldering, welding, spot weld, screw with nut, or rivet, or a combination thereof.

Aspect 6: The system of aspect 4, wherein the adjustable arm is connected to the securement device by a fitting, insert, threading, friction fit, snap-fit or other suitable type of attachment or interlocking mechanism, or by other features that makes the state of two mechanisms or functions mutually dependent.

Aspect 7: The system of aspect 6, wherein the securement device comprises a port for receiving the second end of the adjustable arm.

Aspect 8: The system of aspect 7, wherein the port comprises a cylindrical wall and a bottom base wall, and wherein the walls define an open cavity for receiving the second end of the adjustable arm.

Aspect 9: The system of aspect 7, further comprising a fitting mounted to the second end of the adjustable arm, and wherein the second end of the adjustable arm is connected to the securement device by inserting the fitting into the securement device port.

Aspect 10: The system of aspect 9, wherein the fitting and the port are connected by threading, friction fit, snap-fit, or other suitable type of attachment or interlocked by other features that makes the state of two mechanisms or functions mutually dependent.

Aspect 11: The system of aspect 9, wherein the first portion of the fitting is externally threaded or affixable via friction fit, snap-fit or other suitable type of attachment interlockable by other features and the port is internally threaded or affixable via friction fit, snap-fit or other suitable type of attachment interlockable by other features such that the state of two mechanisms or functions are mutually dependent.

Aspect 12: The system of aspect 7, further comprising an insert mounted to the second end of the adjustable arm, and wherein the second end of the adjustable arm is connected to the securement device by inserting the insert into the port of the securement device.

Aspect 13: The system of aspect 7, further comprising a threaded insert mounted to the second end of the adjustable arm, wherein the securement device port comprises a threaded portion, and wherein the threaded insert is threadably connected to the threaded portion of the securement device port.

Aspect 14: The system of aspect 6, wherein at least a first portion of the second end of the adjustable arm and at least a portion of the port are threaded.

Aspect 15: The system of aspect 14, wherein the first portion of the second end of the adjustable arm is externally threaded and the port is internally threaded.

Aspect 16: The system of aspect 9, wherein at least a first portion of the fitting and at least a portion of the port are threaded.

Aspect 17: The system of aspect 16, wherein the first portion of the fitting is externally threaded and the port is internally threaded.

Aspect 18: The system of aspect 8, wherein the wall of the port is internally threaded and the first portion of the second end of the adjustable arm is externally threaded, and wherein the wall of the port and the arm are configured to engage so that the arm can be secured to the securement device.

Aspect 19: The system of aspect 8, wherein the wall of the port is externally threaded and the first portion of the second end of the adjustable arm is internally threaded, and wherein the wall of the port and the arm are configured to engage so that the arm can be secured to the securement device.

Aspect 20: The system of aspect 9, wherein the wall of the port is internally threaded and the first portion of the fitting is externally threaded, and wherein the wall of the port and the fitting are configured to engage so that the adjustable arm can be secured to the securement device.

Aspect 21: The system of aspect 12, wherein the first portion of the insert is externally threaded and the port is internally threaded.

Aspect 22: The system of aspect 12, wherein the wall of the port is externally threaded and the first portion of the insert is internally threaded, and wherein the wall of the port and the fitting are configured to engage so that the adjustable arm can be secured to the securement device.

Aspect 23: The system of aspect 6, wherein the adjustable arm and securement device are attached by screwing the adjustable arm and securement device together.

Aspect 24: The system of aspect 2, wherein the securement device is a spike, clip, clamp, or bracket, or a combination thereof.

Aspect 25: The system of aspect 24, wherein the securement device is a spike comprising a port for receiving the adjustable arm at a first end, and wherein the spike is configured to anchor the adjustable arm in the ground.

Aspect 26: The system of aspect 25, wherein the spike further comprises at least one handle at a second of the spike, and wherein the handle is configured to further anchor the spike.

Aspect 27: The system of aspect 25, wherein the spike further comprises a first handle and a second handle at the second end of the spike, and wherein the handle is configured to further anchor the spike.

Aspect 28: The system of aspect 24, wherein the securement device is a clip, the clip comprising a port for receiving the adjustable arm, and wherein the clip is configured to clamp the shading device to the object.

Aspect 29: The system of aspect 28, wherein the clip further comprises a first handle and a second handle pivotally connected by a spring, and wherein the first and second handles are configured to forcibly separate into an open position in response to pressure on the first and second handle.

Aspect 30: The system of aspect 24, wherein the securement device is a clamping device, comprising: a) a spring clip, comprising: i) a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and b) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and a outer surface of the first or second clip arm.

Aspect 31: The system of aspect 30, wherein the first end of the clamping arm is detachably connected to the first and second clip arms by extending through the aperture of the first clip arm from a first side of the first clip arm to a second side of the first clip arm, and by extending through the aperture of the second clip arm from a first side of the second clip arm to a second side of the second clip arm.

Aspect 32: The system of aspect 30, wherein the first or second clip arm aperture is on a surface of the first handle portion or second handle portion.

Aspect 33: The system of aspect 30, wherein the clip arm apertures are on a surface of the first handle portion and second handle portion.

Aspect 34: The system of aspect 30, wherein the first jaw or second jaw comprise a gripping pad portion.

Aspect 35: The system of aspect 30, wherein the first jaw and second jaw comprise a gripping pad portion.

Aspect 36: The system of aspect 30, wherein the first jaw or second jaw comprise a gripping pad portion.

Aspect 37: The system of aspect 34, wherein the gripping pad portion is substantially flat.

Aspect 38: The system of aspect 34, wherein the gripping pad portion is pivotally connected.

Aspect 39: The system of aspect 34, wherein the gripping pad portion comprises a compressible material.

Aspect 40: The system of aspect 30, wherein the flat plate portion comprises a compressible material.

Aspect 41: The system of aspect 30, wherein at least a portion the first jaw or second jaw comprise a plurality of teeth, or a combination thereof.

Aspect 42: The system of aspect 30, wherein the outer surface of the first jaw or second jaw comprise a grip pad.

Aspect 43: The system of aspect 42, wherein the grip pad comprises a compressible material.

Aspect 44: The system of aspect 30, wherein the clamping arm is connected to the clip arm by a fitting, insert, threading, friction fit, snap-fit or other suitable type of attachment or interlocking mechanism, or by other features that makes the state of two mechanisms or functions mutually dependent.

Aspect 45: The system of aspect 30, wherein the clip arm aperture comprises a cylindrical inner wall, and wherein the inner wall defines an opening for receiving the clamping arm.

Aspect 46: The system of aspect 45, further comprising a fitting mounted to the inner wall of the aperture, and wherein the clamping arm is connected to the clip arm by inserting the clamping arm into the clip arm aperture.

Aspect 47: The system of aspect 46, wherein the fitting and the clamping arm are connected by threading, friction fit, snap-fit, or other suitable type of attachment or interlocked by other features that makes the state of two mechanisms or functions mutually dependent.

Aspect 48: The system of aspect 46, wherein a first portion of the fitting is threaded or affixable via friction fit, snap-fit or other suitable type of attachment interlockable by other features, and a portion of the clamping arm is threaded or affixable via friction fit, snap-fit or other suitable type of attachment interlockable by other features such that the state of two mechanisms or functions are mutually dependent.

Aspect 49: The system of aspect 45, further comprising an insert mounted to the inner wall of the aperture, and wherein the clamping arm is connected to the clip arm by inserting the clamping arm into the clip arm aperture.

Aspect 50: The system of aspect 45, further comprising a threaded insert mounted to the inner wall of the aperture, wherein the clamping arm comprises a threaded portion, and wherein the threaded insert is threadably connected to the threaded portion of the clamping arm.

Aspect 51: The system of aspect 45, wherein at least a portion of the clamping arm and at least a portion of the inner wall of the clip arm aperture are threaded.

Aspect 52: The system of aspect 30, wherein a portion of the clamping arm is externally threaded and the clip arm aperture is internally threaded.

Aspect 53: The system of aspect 46, wherein at least a portion of the fitting and at least a portion of the clamping arm are threaded.

Aspect 54: The system of aspect 53, wherein the threaded portion of the fitting is internally threaded and the clamping arm is externally threaded.

Aspect 55: The system of aspect 53, wherein the wall of the clip arm aperture is internally threaded and the threaded portion of the clamping arm is externally threaded, and wherein the wall of the clip arm aperture and the clamping arm are configured to engage so that the clamping arm can be secured to the clip arm.

Aspect 56: The system of aspect 53, wherein the wall of the clip arm aperture is externally threaded and the threaded portion of the clamping arm is internally threaded, and wherein the wall of the clip arm aperture and the clamping arm are configured to engage so that the clamping arm can be secured to the clip arm.

Aspect 57: The system of aspect 53, wherein the clamping arm and the clip arm are attached by screwing the clamping arm and the clip arm together.

Aspect 58: The system of aspect 2, wherein the shade device can support wind speed of at least about 10 mph.

Aspect 59: The system of aspect 2, wherein the securement device is comprised of metal, thermoplastic resin, ceramic, wood, or a combination thereof.

Aspect 60: The system of aspect 2, further comprising a grommet defining the edge of the aperture.

Aspect 61: The system of aspect 60, further comprising a grommet washer defining the outer edge of the grommet.

Aspect 62: The system of aspect 2, wherein the shade component is comprised of fabric.

Aspect 63: The system of aspect 2, wherein the adjustable arm comprises a bendable interior member and a protective outer member enclosing the interior member.

Aspect 64: The system of aspect 63, wherein the bendable interior member comprises a metal rod.

Aspect 65: The system of aspect 63, wherein the protective outer member comprises a comprises a compressible material.

Aspect 66: The system of aspect 2, wherein the object is a support structure, an apparatus, or the ground.

Aspect 67: The system of aspect 66, wherein the support structure is an article of furniture.

Aspect 68: The system of aspect 2, further comprising a bag for receiving the screen assembly, adjustable arm, and securement device; wherein the screen assembly and adjustable arm are in a collapsed state.

Aspect 69: The system of aspect 2, comprising a) a deformable screen assembly having a border about its edge, the screen assembly comprising: i) a support frame defining the edge of the screen assembly, and ii) a screen component having at least two apertures for receiving an adjustable arm, the apertures being contained within the screen assembly edge; and b) an adjustable arm having first and second opposed ends, the first end of the adjustable arm being detachably connected to the screen assembly by extending through a first aperture from a first side of the screen assembly to a second side of the screen assembly, and by extending through a second aperture from the second side of the screen assembly to the first side of the screen assembly; and c) a securement device comprising: i) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and ii) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and an outer surface of the first or second clip arm.

Aspect 70: A device for clamping an object, comprising: a) a spring clip, comprising: a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and b) a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and a outer surface of the first or second clip arm.

Aspect 71: The device of aspect 70, wherein the first end of the clamping arm is detachably connected to the first and second clip arms by extending through the of the first clip arm aperture from a first side of the first clip arm to a second side of the first clip arm, and by extending through the aperture of the second clip arm aperture from a first side of the second clip arm to a second side of the second clip arm.

Aspect 72: The device of aspect 70, wherein the first or second clip arm aperture is on a surface of the first handle portion or second handle portion.

Aspect 73: The device of aspect 70, wherein the clip arm apertures are on a surface of the first handle portion and second handle portion.

Aspect 74: The device of aspect 70, wherein the first jaw or second jaw comprise a gripping pad portion.

Aspect 75: The device of aspect 70, wherein the first jaw and second jaw comprise a gripping pad portion.

Aspect 76: The device of aspect 70, wherein the first jaw or second jaw comprise a gripping pad portion.

Aspect 77: The device of aspect 74, wherein the gripping pad portion is substantially flat.

Aspect 78: The device of aspect 74, wherein the gripping pad portion is pivotally connected.

Aspect 79: The device of aspect 74, wherein the gripping pad portion comprises a compressible material.

Aspect 80: The device of aspect 70, wherein at least a portion the first jaw or second jaw comprise a plurality of teeth.

Aspect 81: The device of aspect 70, wherein the outer surface of the first jaw or second jaw comprise a grip pad.

Aspect 82: The device of aspect 81, wherein the grip pad comprises a compressible material.

Aspect 83: The device of aspect 70, wherein the flat plate portion comprises a compressible material.

Aspect 84: The device of aspect 70, wherein the clamping arm is connected to the clip arm by a fitting, insert, threading, friction fit, snap-fit or other suitable type of attachment or interlocking mechanism, or by other features that makes the state of two mechanisms or functions mutually dependent.

Aspect 85: The device of aspect 81, wherein the clip arm aperture comprises a cylindrical inner wall, and wherein the inner wall defines an opening for receiving the clamping arm.

Aspect 86: The device of aspect 85, further comprising a fitting mounted to the inner wall of the aperture, and wherein the clamping arm is connected to the clip arm by inserting the clamping arm into the clip arm aperture.

Aspect 87: The device of aspect 86, wherein the fitting and the clamping arm are connected by threading, friction fit, snap-fit, or other suitable type of attachment or interlocked by other features that makes the state of two mechanisms or functions mutually dependent.

Aspect 88: The device of aspect 86, wherein a portion of the fitting is threaded or affixable via friction fit, snap-fit or other suitable type of attachment interlockable by other features, and a portion of the clamping arm is threaded or affixable via friction fit, snap-fit or other suitable type of attachment interlockable by other features such that the state of two mechanisms or functions are mutually dependent.

Aspect 89: The device of aspect 85, further comprising an insert mounted to the inner wall of the aperture, and wherein the clamping arm is connected to the clip arm by inserting the clamping arm into the clip arm aperture.

Aspect 90: The device of aspect 85, further comprising a threaded insert mounted to the inner wall of the aperture, wherein the clamping arm comprises a threaded portion, and wherein the threaded insert is threadably connected to the threaded portion of the clamping arm.

Aspect 91: The device of aspect 85, wherein at least a portion of the clamping arm and at least a portion of the inner wall of the clip arm aperture are threaded.

Aspect 92: The device of aspect 70, wherein a portion of the clamping arm is externally threaded and the clip arm aperture is internally threaded.

Aspect 93: The device of aspect 85, wherein at least a portion of the fitting and at least a portion of the clamping arm are threaded.

Aspect 94: The device of aspect 85, wherein the first portion of the fitting is internally threaded and the clamping arm is internally threaded.

Aspect 95: The device of aspect 85, wherein the wall of the clip arm aperture is internally threaded and the threaded portion of the clamping arm is externally threaded, and wherein the wall of the clip arm aperture and the clamping arm are configured to engage so that the clamping arm can be secured to the clip arm.

Aspect 96: The device of aspect 85, wherein the wall of the clip arm aperture is externally threaded and the threaded portion of the clamping arm is internally threaded, and wherein the wall of the clip arm aperture and the clamping arm are configured to engage so that the clamping arm can be secured to the clip arm.

Aspect 97: The device of aspect 81, wherein the clamping arm and the clip arm are attached by screwing the clamping arm and the clip arm together.

Aspect 98: The device of aspect 70, wherein the spring clip further comprises a port for receiving a mounting arm.

Aspect 99: The device of aspect 98, wherein the port comprises a cylindrical wall and a bottom base wall, and wherein the walls define an open cavity for receiving the second end of the adjustable arm.

Aspect 100: The device of aspect 99, further comprising a fitting mounted to the second end of the adjustable arm, and wherein the second end of the adjustable arm is connected to the securement device by inserting the fitting into the securement device port.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A shading system comprising:
   a) a deformable screen assembly having a border about its edge, the screen assembly comprising:
      i) a support frame defining the edge of the screen assembly, and
      ii) a screen component having at least two apertures for receiving an adjustable arm, the apertures being contained within the screen assembly edge;
   b) an adjustable arm having first and second opposed ends, the first end of the adjustable arm being detachably connected to the screen assembly by extending through a first aperture of the screen component from a first side of the screen assembly to a second side of the screen assembly, and by extending through a second aperture of the screen component from the second side of the screen assembly to the first side of the screen assembly; and
   c) a securement device for securing the adjustable arm to an object, wherein the second end of the arm is connected to the securement device; and
      wherein the securement device comprises a clamping device comprising
      a spring clip, comprising:
         a first clip arm and a second clip arm, each clip arm having a handle portion, a jaw, and an aperture, the first and second clip arms being pivotally connected at a pivot point by a spring joint, the spring joint being configured to forcibly compress the first and second jaws together in a closed position, the first and second jaws being configured to forcibly separate into an open position in response to pressure on the first and second handle portions, the apertures being configured to receive a clip arm therethrough; and
      a clamping arm having a first end and an opposed second end, the second end of the clamping arm having a flat plate portion, the first end of the clamping arm being detachably connected to at least one clip arm by extending through the aperture of said clip arm from a first side of said clip arm to a second side of said clip arm, the clamping arm being configured to secure the clamping device to an object when the first and second jaws are the closed position by forcibly compressing the object between the flat plate portion of the clamping arm and a outer surface of the first or second clip arm.

2. The system of claim 1, wherein the second end of the adjustable arm is detachably connected to the securement device.

3. The system of claim 1, wherein the adjustable arm is connected to the securement device by a connecting means, the connecting means comprising a fitting, insert, adhesive, brazing, soldering, welding, spot weld, screw with nut, rivet, threading, friction fit, snap-fit, twist-lock, or interlocking mechanism or a combination thereof.

4. The system of claim 1, wherein the securement device comprises a port for receiving the second end of the adjustable arm.

5. The system of claim 4, further comprising a fitting mounted to the second end of the adjustable arm, and wherein the second end of the adjustable arm is connected to the securement device by inserting the fitting into the securement device port.

6. The system of claim 5, wherein the fitting and the port are connected by threading, friction fit, snap-fit, twist-lock, or interlocking mechanism.

7. The system of claim 6, wherein the adjustable arm and securement device are attached by screwing the adjustable arm and securement device together.

8. The system of claim 1, wherein the first end of the clamping arm is detachably connected to the first and second clip arms by extending through the aperture of the first clip arm from a first side of the first clip arm to a second side of the first clip arm, and by extending through the aperture of the second clip arm from a first side of the second clip arm to a second side of the second clip arm.

9. The system of claim 1, wherein the first or second clip arm aperture is on a surface of the first handle portion or second handle portion.

10. The system of claim 1, wherein the first jaw and second jaw comprise a gripping pad portion.

11. The system of claim 1, wherein the clamping arm is connected to the clip arm by a fitting, insert, threading, friction fit, snap-fit, interlocking mechanism, or ratcheting mechanism.

12. The system of claim 11, further comprising an insert mounted to the inner wall of the aperture, and wherein the clamping arm is connected to the clip arm by inserting the clamping arm into the clip arm aperture.

13. The system of claim 1, wherein the shade device can support wind speed of at least about 10 mph.

14. The system of claim 1, further comprising a bag for receiving the screen assembly, adjustable arm, and securement device; wherein the screen assembly and adjustable arm are in a collapsed state.

* * * * *